United States Patent [19]

Abel et al.

[11] 4,354,742
[45] Oct. 19, 1982

[54] OPTICAL SYSTEM HAVING A DUAL FIELD OF VIEW

[75] Inventors: Irving R. Abel, Lexington; Marcus R. Hatch, Arlington, both of Mass.

[73] Assignee: Honeywell Inc., Minneapolis, Minn.

[21] Appl. No.: 205,365

[22] Filed: Nov. 10, 1980

[51] Int. Cl.³ .............................................. G02B 17/08
[52] U.S. Cl. .................... 350/442; 350/443; 350/444
[58] Field of Search ............... 350/442, 443, 444, 20, 350/27, 29

[56] References Cited

U.S. PATENT DOCUMENTS

| 2,761,072 | 8/1956 | Wormser . |
| 2,798,961 | 7/1957 | Wormser . |
| 2,798,962 | 7/1957 | Wormser . |
| 3,829,192 | 8/1974 | Wheeler . |
| 3,881,103 | 4/1975 | Menke et al. . |
| 3,941,923 | 3/1976 | Wheeler . |

FOREIGN PATENT DOCUMENTS 2720990  5/1977  Fed. Rep. of Germany .
1322333  7/1969  United Kingdom .
1531893  1/1977  United Kingdom .

Primary Examiner—John K. Corbin
Assistant Examiner—Rebecca D. Gass
Attorney, Agent, or Firm—John P. Sumner

[57] ABSTRACT

An optical system having a dual field of view. The system includes a wide-angle objective comprising a lens, a concave primary mirror, and a movable convex secondary mirror having a first position and a second position. When in the first position, the secondary mirror permits the wide-angle objective to focus radiation. When in the second position, the secondary mirror prevents radiation from being focused by the wide-angle objective. The combination of the secondary mirror when in the second position and the primary mirror comprise a narrow-angle objective with the primary mirror converging radiation to the secondary mirror and the secondary mirror focusing radiation. Thus, the optical system has a wide-angle field of view whenever the secondary mirror is in the first position and a narrow-angle field of view whenever the secondary mirror is in the second position.

16 Claims, 2 Drawing Figures

4,354,742

OPTICAL SYSTEM HAVING A DUAL FIELD OF VIEW

CROSS REFERENCE TO RELATED APPLICATIONS

Reference should be made to our copending applications entitled "Compact Optical System" and "Field Curvature Control" which are filed on even date herewith and which are assigned to the same assignee as the present application.

BACKGROUND OF THE INVENTION

The present invention relates to an optical system having a dual field of view. More particularly, the present invention relates to a simple, space-efficient mechanical actuation of a field of view change function made possible by a cassegrainian configuration. (The precise definition of a Cassegrain system is one consisting of a concave primary mirror which is specifically a parabola and a convex secondary mirror which is specifically a hyperbola. However, systems comprising a concave primary mirror and a convex secondary mirror are now often referred to as cassegrainian systems without particular reference to the particular geometry of the mirrors.)

The present invention provides a dual field of view without the complexity typically found in prior art systems. See, for example, the following U.S. patents:

| | | |
|---|---|---|
| 2,761,072 | Wormser | Aug. 28, 1956 |
| 2,798,961 | Wormser | July 9, 1957 |
| 2,798,962 | Wormser | July 9, 1957 |
| 3,881,103 | Menke et al | Apr. 29, 1975 |

In the systems disclosed in each of these patents, at least one additional movable mirror or prism has been added for the purpose of providing a dual or multiple function. As explained further below, this is in contrast with the present invention, which employs a simple, space efficient movement of an optical element which is not added to the system but, rather, is an inherent part of a cassegrainian arrangement.

SUMMARY OF THE INVENTION

The present invention is an optical system having a dual field of view. The system includes a wide-angle objective comprising a lens, a concave primary mirror, and a movable convex secondary mirror having a first position and a second position. When in the first position, the secondary mirror permits the wide-angle objective to focus radiation. When in the second position, the secondary mirror prevents radiation from being focused by the wide-angle objective. The combination of the secondary mirror when in the second position and the primary mirror comprise a narrow-angle objective with the primary mirror converging radiation to the secondary mirror and the secondary mirror focusing radiation. Thus, the optical system has a wide-angle field of view whenever the secondary mirror is in the first position and a narrow-angle field of view whenever the secondary mirror is in the second position.

DESCRIPTION OF THE PREFERRED EMBODIMENT

Figure 1:
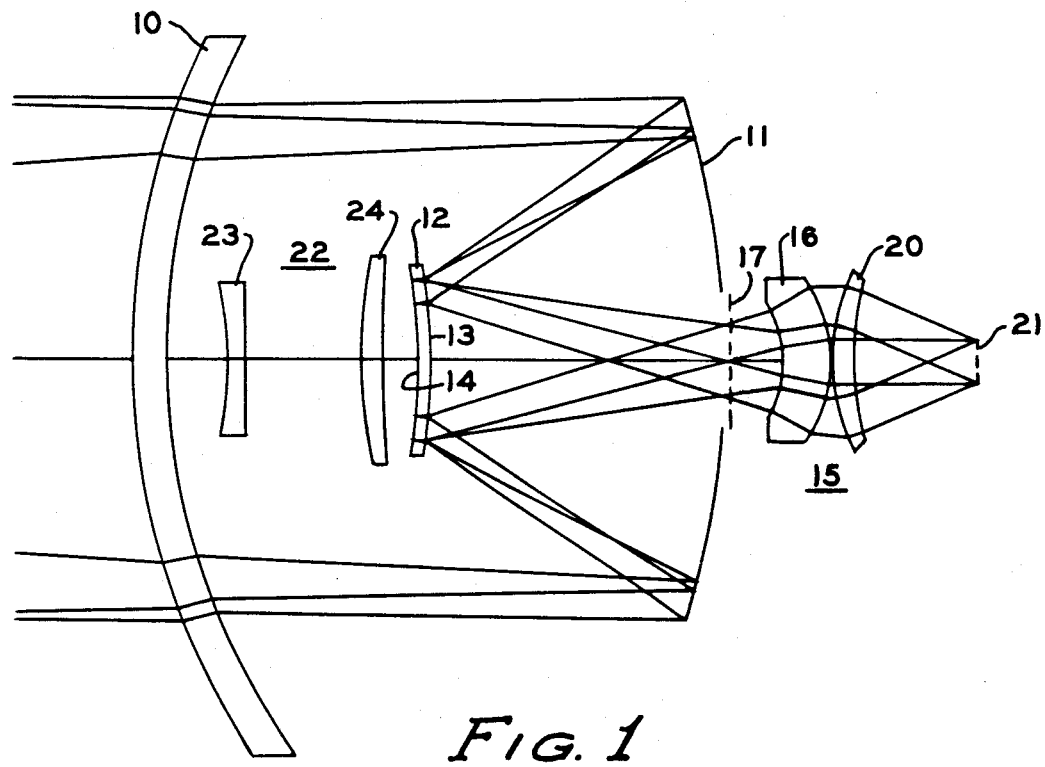
FIG. 1 illustrates an embodiment of the present invention in a narrow-angle mode of operation.

FIG. 1 illustrates an embodiment of the present invention in a narrow-angle, two-mirror mode of operation. Collimated radiation from a point in the scene is transmitted through a concentric dome window 10 with appropriate refractions at each surface. The beam is slighly divergent as it impinges upon a concave primary front surface mirror 11. It is then converged to a secondary mirror 12 which reduces convergence of the beam while reflecting it backward, the radiation being focused at a field stop 17. The radiation may then be transmitted through collimator 15 comprising lenses 16 and 20 having appropriate refractions at each surface. Lenses 16 and 20 collimate the radiation and direct it through exit pupil 21.

In the embodiment disclosed, secondary mirror 12 is a mangin mirror having a first surface 13 and a second or back surface 14, back surface 14 being coated with reflective material. As is further explained in the previously mentioned copending applications, mirrors 11 or 12, or both mirrors 11 and 12, may be mangin mirrors configured to control field curvature. However, in its simplest form, the present invention may comprise mirrors without provision for correction of field curvature. For example, the present invention may be employed in systems which are not compact or in compact systems in which field curvature control is achieved by more conventional means; in such situations, the mirrors in the present invention may be of any design found suitable for the intended purpose and may be of either front or back surface configuration. Alternately, either mirror may be a mangin mirror with surfaces such as 13 and 14 having a shape for providing control of field curvature. Such embodiments are more fully explained in the previously mentioned copending applications, which are hereby incorporated by reference in the present application as if fully set forth herein.

Figure 2:
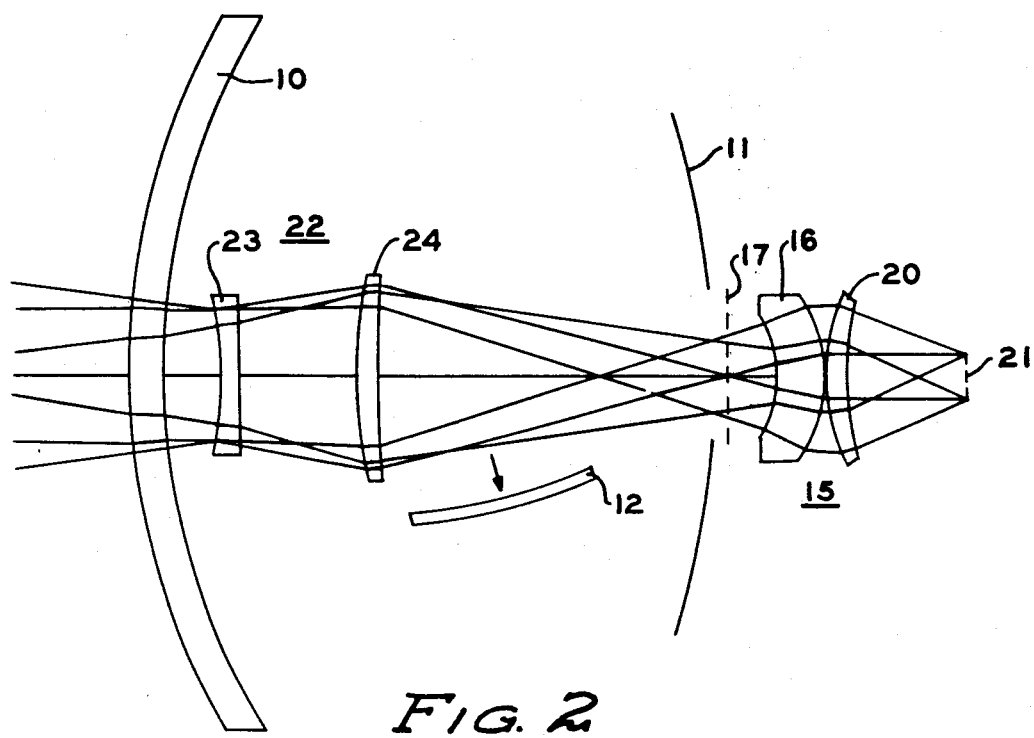
FIG. 2 illustrates an embodiment of the present invention in a wide-angle mode of operation.

As previously indicated, the present invention provides a simple, space-efficient mechanical actuation of a field of view change function made possible by the cassegrainian configuration. A wide-angle mode of operation (FIG. 2) is introduced simply by pivoting or otherwise moving secondary mirror 12 out of the path of a fixed objective 22 which in the disclosed embodiment comprises lenses 23 and 24. As with mirrors 11 and 12 comprising the narrow-angle objective, wide-angle objective 22 focuses radiation in the plane of field stop 17. Thus, for the disclosed embodiment, collimator 15 is common to both modes of operation. Obviously, although it may normally be the case, a system employing the present invention would not require that the wide-angle objective (lenses 23 and 24 in the disclosed embodiment) and the narrow-angle objective (mirrors 11 and 12 in the disclosed embodiment) focus radiation at the same location.

Secondary mirror 12 may be made movable through a pivot and stop, sliding mechanisms, or other suitable hardware (not shown).

Tables 1, 2, and 3 set forth below give the dimensions and parameters of one preferred embodiment of an optical system comprising the present invention.

TABLE 1
SPECIFICATION-NARROW ANGLE MODE EXAMPLE

| Element | Radius (inches) | Thickness (inches) | Material | Conic Constant |
|---|---|---|---|---|
| Dome 10 | 6.0 | .30 | Zinc | |
| | 5.7 | 4.8 | Sulfide | |
| Primary Mirror 11 | −7.166 | −2.555 | Aluminum | −.75102 |
| Secondary Mirror 12 | −6.758 | −.10 | Germanium | |
| | −5.475* | .10 | | −4.7 |
| Field Stop 17 | | 2.555 | | |
| | | .501 | | |
| Collimator Lens 16 | −.818 | .401 | Germanium | |
| | −1.047 | .01 | | |
| Collimator Lens 20 | 1.544 | .20 | Germanium | −.3565 |
| | 2.340 | | | |
| Exit Pupil 21 | | 1.04 | | |

*Surface is Aspheric:

$$\text{Sag} = \frac{\frac{y^2}{r}}{1 + \sqrt{1 - (K+1)\frac{y^2}{r^2}}} + dy^4 + ey^6 + fy^8$$

where
$d = 2.213 \times 10^{-3}$    $y$ = Aperture height
$e = -1.459 \times 10^{-3}$    $r$ = Radius of the surface
$f = 4.591 \times 10^{-4}$    $k$ = Conic constant

TABLE 2
SPECIFICATION-WIDE ANGLE MODE EXAMPLE

| Element | Radius (inches) | Thickness (inches) | Material | Conic Constant |
|---|---|---|---|---|
| Dome 10 | 6.0 | .30 | Zinc | |
| | 5.7 | .55 | Sulfide | |
| Objective Lens 23 | −8.702 | .15 | Germanium | |
| | | 1.0 | | |
| Objective Lens 24 | 4.200 | .20 | Germanium | −2.263 |
| | 24.189 | 3.401 | | |
| Collimator Lens 16 | −.818 | .401 | Germanium | |
| | −1.047 | .01 | | |
| Collimator Lens 20 | 1.544 | .20 | Germanium | −.3565 |
| | 2.340 | | | |
| Exit Pupil 21 | | 1.04 | | |

TABLE 3
EXAMPLE SYSTEM PARAMETERS - Narrow Angle Mode

| | |
|---|---|
| Telescope Magnification | 11.9 |
| External Field of View | 2.38° × 3.22° |
| Entrance Pupil Diameter | 4.4 in. |
| Objective F-Number | 2.0 |
| Objective Focal Length | 8.85 in. |
| Collimator Focal Length | .744 in. |

Tables 1 and 2 are laid out in a manner common in the art; if more than one dimension is given for an element, the dimensions appear in the order that light travels from the scene through the system. For example, for dome 10, the first radius listed of 6.0 inches corresponds to the first surface of dome 10, and the radius of 5.7 inches corresponds to the second surface of dome 10.

In the thickness column of Table 1, the numbers include on-axis air space thicknesses listed in the order in which light travels through the system. Accordingly, the first number of 0.30 inch is the thickness of dome 10. The second number of 4.8 inches corresponds to the on-axis distance between the second surface of dome 10 and a point that would intersect the radius of the reflective front surface of primary mirror 11. The minus sign associated with the first dimension of 2.555 inches indicates light traveling in a backward direction. The 0.10 inch number listed in association with mangin secondary mirror 12 indicates the thickness of the mirror, the first number being negative since light is traveling in the reverse direction in its first transit to the reflective back surface 14 of that mirror. The positive 2.555 inch dimension is the air space distance between first surface 13 of mirror 12 and field stop 17, which is the first focal plane. The dimension of 0.501 inch is the distance between field stop 17 and the first surface of lens 16 within collimator 15. The 0.401 inch dimension listed in association with collimator lens 16 is the thickness of that lens, the 0.01 inch dimension being the air space thickness between the second surface of lens 16 and the first surface of lens 20. The 0.20 inch dimension listed in association with lens 20 is the thickness of that lens, the 1.04 inch dimension being the distance between the second surface of lens 20 and exit pupil 21.

Table 2 is read in a similar manner. It should be noted, of course, that the dimensions and parameters listed in Tables 1, 2, and 3 do not represent the present invention, but rather a particular application of it.

Further, although mirrors 11 and 12 are both disclosed as aspheric (see Table 1), either or both of these mirrors can be spherical.

In addition, while primary mirror 11 is disclosed as having an aperture for transmission of radiation reflected from secondary mirror 12, the system could be configured without the aperture and with secondary mirror 12 reflecting radiation past the edge of primary mirror 11.

In the present invention, compactness of the cassegrainian narrow-angle objective can be quantified by a ratio of the narrow-angle objective physical length divided by the narrow-angle objective focal length. For the embodiment disclosed in Tables 1, 2, and 3, that ratio is 0.30 which is obtained by dividing 2.655 inches (0.10 inch plus 2.555 inches) by 8.85 inches; in this calculation, 0.10 inch is the thickness of mangin secondary mirror 12, 2.555 inches is the air space distance between the first surface of mirror 12 and field stop 17 (the first image), and 8.85 inches is the objective focal length.

The present invention is to be limited only in accordance with the scope of the appended claims, since persons skilled in the art may devise other embodiments still within the limits of the claims.

The embodiments of the invention in which an exclusive property or right is claimed are defined as follows:

1. An optical system having a duel field of view comprising:
    a wide-angle objective comprising a lens;
    a concave primary mirror;
    a movable convex secondary mirror having a first position and a second position;
    the secondary mirror when in the first position permitting the wide-angle objective to focus radiation;
    the secondary mirror when in the second position preventing radiation from being focused by the wide-angle objective;
    the combination of the secondary mirror when in the second position and the primary mirror comprising a narrow-angle objective with the primary mirror converging radiation to the secondary mirror and the secondary mirror focusing radiation;
    whereby the optical system has a wide-angle field of view whenever the secondary mirror is in the first position, and a narrow-angle field of view whenever the secondary mirror is in the second position.

2. The apparatus of claim 1 wherein the radiation is focused at the same location by both the wide-angle objective and the narrow-angle objective.

3. The apparatus of claim 2 wherein at least one of the primary mirror and the secondary mirror is aspheric.

4. The apparatus of claim 3 wheein both the primary mirror and the secondary mirror are aspheric.

5. The apparatus of claim 3 wherein the primary mirror has an aperture for transmission of radiation reflected from the secondary mirror.

6. The apparatus of claim 5 wherein compactness of the narrow-angle objective is measured by the ratio:

$$\frac{\text{narrow-angle objective physical length}}{\text{narrow-angle objective focal length}}$$

and wherein the ratio is approximately 0.3.

7. The apparatus of claim 1 wherein at least one of the primary mirror and the secondary mirror is aspheric.

8. The apparatus of claim 7 wherein both the primary mirror and the secondary mirror are aspheric.

9. The apparatus of claim 7 wherein the primary mirror has an aperture for transmission of radiation reflected from the secondary mirror.

10. The apparatus of claim 9 wherein compactness of the narrow-angle objective is measured by the ratio:

$$\frac{\text{narrow-angle objective physical length}}{\text{narrow-angle objective focal length}}$$

and wherein the ratio is approximately 0.3.

11. The apparatus of claim 1 wherein the primary mirror has an aperture for transmission of radiation reflected from the secondary mirror.

12. The apparatus of claim 11 wherein compactness of the narrow-angle objective is measured by the ratio:

$$\frac{\text{narrow-angle objective physical length}}{\text{narrow-angle objective focal length}}$$

and wherein the ratio is approximately 0.3.

13. The apparatus of claim 1 wherein compactness of the narrow-angle objective is measured by the ratio:

$$\frac{\text{narrow-angle objective physical length}}{\text{narrow-angle objective focal length}}$$

and wherein the ratio is approximately 0.3.

14. The apparatus of claim 1 wherein the convex secondary mirror comprises a lens having a first and second surface, the second surface being coated with reflective material, the radiation received from the primary mirror being refracted at the first surface, reflected back from the second surface, and then refracted once again by the first surface, the configuration of the first and second surfaces providing control of field curvature.

15. The apparatus of claim 1 wherein the convex secondary mirror comprises a lens having a first and a second surface, the second surface being coated with reflective material, the radiation received from the primary mirror being refracted at the first surface, reflected back from the second surface, and then refracted once again by the first surface, the first and second surfaces each having radii which determine the field curvature by the equation $$1/R = 2[(n-1)/r_1 + 1/r_2]/n$$

where R is the radius of the field curvature, n is the index of refraction of the lens, $r_1$ is the radius of the first surface, and $r_2$ is the radius of the second surface.

16. The apparatus of claim 15 wherein the power of the secondary mirror is $1/f$ and is defined by the equation $$1/f = 2[n/r_2 - (n-1)r_1]$$

wherein f is the focal length of the secondary mirror, n is the index of refraction of the lens, $r_1$ is the radius of the first surface, and $r_2$ is the radius of the second surface, whereby the radii of the first and second surfaces can be selected by provide any combination of focusing power and field curvature.

* * * * *